(12) United States Patent
Jiang et al.

(10) Patent No.: US 10,250,143 B1
(45) Date of Patent: Apr. 2, 2019

(54) AC-DC CONVERTING APPARATUS AND METHOD THEREOF

(71) Applicant: Monolithic Power Systems, Inc., San Jose, CA (US)

(72) Inventors: Jian Jiang, Los Gatos, CA (US); Eric Yang, Saratoga, CA (US); Di Han, San Jose, CA (US)

(73) Assignee: Monolithic Power Systems, Inc., San Jose, CA (US)

(*) Notice: Subject to any disclaimer, the term of this patent is extended or adjusted under 35 U.S.C. 154(b) by 0 days.

(21) Appl. No.: 16/057,767

(22) Filed: Aug. 7, 2018

(51) Int. Cl.
| | |
|---|---|
| *H02M 3/158* | (2006.01) |
| *H02M 7/04* | (2006.01) |
| *H02J 3/14* | (2006.01) |
| *H02J 3/28* | (2006.01) |
| *H02M 3/07* | (2006.01) |
| *H02M 1/00* | (2006.01) |

(52) U.S. Cl.
CPC .............. *H02M 3/1582* (2013.01); *H02J 3/14* (2013.01); *H02J 3/28* (2013.01); *H02M 3/07* (2013.01); *H02M 7/043* (2013.01); *H02M 2001/0016* (2013.01)

(58) Field of Classification Search
CPC .... H02M 3/38; H02M 3/1584; H02M 3/1582; H02M 3/07; H02M 1/4208; H02M 7/00; H02M 7/04; H02M 7/043; H02M 7/217; H02J 3/14; H02J 3/28
See application file for complete search history.

(56) References Cited

U.S. PATENT DOCUMENTS

| | | | | |
|---|---|---|---|---|
| 5,663,635 A | * | 9/1997 | Vinciarelli | H02M 3/155 323/224 |
| 7,154,250 B2 | * | 12/2006 | Vinciarelli | H02M 3/1582 323/240 |
| 7,768,245 B1 | * | 8/2010 | De Cremoux | H02M 3/156 323/225 |
| 8,643,351 B2 | | 2/2014 | Lai et al. | |
| 9,242,567 B2 | * | 1/2016 | Kim | B60L 11/1811 |
| 2004/0079953 A1 | * | 4/2004 | Mednik | H02M 1/4208 257/82 |
| 2013/0106195 A1 | * | 5/2013 | Kusch | H02J 7/1423 307/82 |
| 2017/0302195 A1 | * | 10/2017 | Ye | H02M 7/483 |

OTHER PUBLICATIONS

U.S. Appl. No. 15/475,002, filed Mar. 30, 2017, Monolithic Power Systems, Inc.

* cited by examiner

*Primary Examiner* — Adolf Berhane
(74) *Attorney, Agent, or Firm* — Perkins Coie LLP

(57) ABSTRACT

An AC/DC converting apparatus having first and second input nodes for receiving an AC input voltage Vin, a first pair of switches for coupling a first terminal of a first inductor to the first input node and ground, a second pair of switches for coupling a second terminal of the first inductor to an output node for providing a DC output voltage Vout and ground, a third pair of switches for coupling a first terminal of a second inductor to the second input node and ground, and a fourth pair of switches for coupling a second terminal of the second inductor to the output node and ground. The first pair of switches is turned ON when Vin is in a first portion having a first polarity, the third pair of switches is turned ON when Vin is in a second portion having a second polarity.

20 Claims, 13 Drawing Sheets

AC-DC CONVERTING APPARATUS AND METHOD THEREOF

TECHNICAL FIELD

The present invention generally relates to electrical circuit, and more specifically relates to apparatus and methods for converting alternating current (AC) to direct current (DC).

BACKGROUND

Home and industrial controls are usually powered by a 24V AC system. For traditional power solution for those applications, as shown in FIG. 1, an AC/DC converting apparatus 100 having a diode rectifier bridge 101, a high voltage bulk capacitor 102, and a high voltage DC/DC converter 103 is needed to convert a 24V AC voltage to a desired DC output voltage Vout to power the home and industrial control circuits. As shown in FIGS. 2A and 2B, the diode rectifier bridge 101 is configured to convert positive and negative half cycles of the AC input voltage Vin to a full-wave-rectified voltage waveform with positive polarity. As shown in FIG. 2C, the high voltage bulk capacitor 102 is configured to smooth the full-wave-rectified voltage waveform and to make a DC input voltage Vindc continue nearing a peak voltage Vpeak during low portions of the full-wave-rectified voltage waveform. The high voltage DC/DC converter 103 is used to regulate the DC input voltage Vindc shown in FIG. 2C to the desired DC output voltage Vout.

For a trend of smart home and industrial automation, more power and/or current are needed from the 24V AC system. Current applications can require up to 1 A/30 W. The diode rectifier bridge 101 will be generating a lot of heat in the AC/DC converting apparatus 100. This can cause the system malfunction, like a thermostat cannot read room temperature accurately. In addition, more and more bulk capacitors are needed for higher power, which leads to high system cost and takes too much space of the system.

It would be desirable therefore to provide an AC/DC converting apparatus and method that can eliminate the need of the diode rectifier bridge and also can eliminate the need of high voltage bulk capacitors to acquire low total system cost and high conversion efficiency.

SUMMARY

In view of the above requirements, there has been provided, in accordance with an embodiment of the present disclosure, an AC/DC converting apparatus for converting an AC input voltage Vin to a DC output voltage Vout. The AC/DC converting apparatus comprises: a first input node and a second input node to which the AC input voltage Vin is inputted, wherein a cycle of the AC input voltage has a first portion having a first polarity and a second portion having a second polarity; an output node from which the DC output voltage Vout is outputted; a first buck-boost converter having a first pair of switches for selectively coupling a first terminal of a first inductor to the first input node and a ground, and a second pair of switches for selectively coupling a second terminal of the first inductor to the output node and the ground; a second buck-boost converter having a third pair of switches for selectively coupling a first terminal of a second inductor to the second input node and the ground, and a fourth pair of switches for selectively coupling a second terminal of the second inductor to the output node and the ground; and a controller configured to control the first, second, third and fourth pair of switches, wherein the first pair of switches is turned ON when the AC input voltage Vin is in the first portion, and the third pair of switches is turned ON when the AC input voltage Vin is in the second portion.

BRIEF DESCRIPTION OF THE DRAWING

The present invention can be further understood with reference to the following detailed description and the appended drawings.

The use of the same reference label in different drawings indicates the same or like components.

DETAILED DESCRIPTION

Various embodiments of the technology will now be described. In the following description, some specific details, such as example circuits and example values for these circuit components, devices or process, are included to provide a thorough understanding of embodiments. One skilled in the relevant art will recognize, however, that the technology can be practiced without one or more specific details, or with other methods components, materials, etc.

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Figure 3:
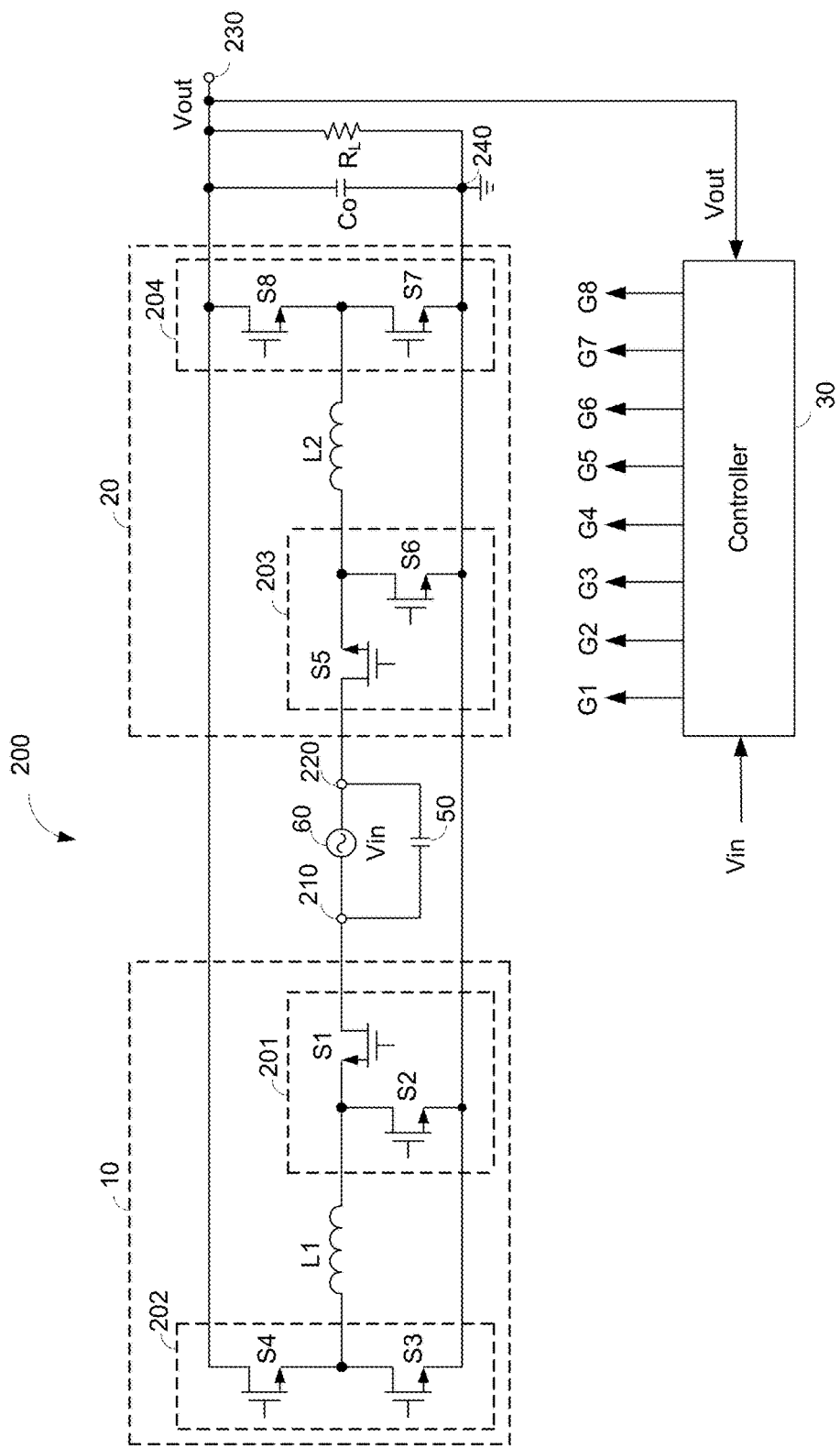
FIG. 3 schematically illustrates an AC/DC converting apparatus 200 for converting an AC input voltage Vin to a DC output voltage Vout in accordance with one embodiment of the present invention.

FIG. 3 schematically illustrates an AC/DC converting apparatus 200 for converting an AC input voltage Vin to a DC output voltage Vout in accordance with one embodiment of the present invention. The AC/DC converting apparatus 200 is configured to provide the DC output voltage Vout for powering a load RL. As shown in FIG. 3, the AC/DC converting apparatus 200 comprises an input node 210 and an input node 220 to which the AC input voltage Vin is inputted, an output node 230 from which the DC output voltage Vout is outputted, a first buck-boost converter 10, a second buck-boost converter 20 and a controller 30. In the embodiment of FIG. 3, the AC input voltage Vin is from an AC voltage source 60. In another embodiment, the AC voltage source 60 may comprises an output of a transformer.

The first buck-boost converter 10 comprises a first pair of switches 201, a second pair of switches 202 and an inductor L1. More specifically, the first pair of switches 201 comprises a top switch S1 and a bottom switch S2 for selectively coupling a first terminal of the inductor L1 to the input node 210 and a ground 240, the second pair of switches 202 comprises a top switch S4 and a bottom switch S3 for selectively coupling a second terminal of the inductor L1 to the output node 230 and the ground 240.

The second buck-boost converter 20 comprises a third pair of switches 203, a fourth pair of switches 204 and an inductor L2. More specifically, the third pair of switches 203 comprises a top switch S5 and a bottom switch S6 for selectively coupling a first terminal of the inductor L2 to the input node 220 and the ground 240, the fourth pair of switches 204 comprises a top switch S8 and a bottom switch S7 for selectively coupling a second terminal of the inductor L2 to the output node 230 and the ground 240.

The switches S1~S8 are switchable between ON state and OFF state and each of them may be implemented by an n-channel enhancement MOS transistor (NMOS), a p-channel enhancement MOS transistor (PMOS), or other controllable switch. In the following descriptions, it is assumed that each of the switches S1~S8 is implemented by an NMOS. In the embodiment of FIG. 3, the controller 30 is configured to send 8 control signals G1~G8 to control the switches S~S8 respectively. The details of the embodiments described below with reference to FIG. 4

In one embodiment, the AC/DC converting apparatus 200 shown in FIG. 3 further comprises an output capacitor Co coupled between the output node 230 and the ground 240 to filter output ripple of the DC output voltage Vout. It should be noted that very little filter capacitance of the output capacitor Co is required compared with the required capacitance of the high voltage bulk capacitor 102 in FIG. 1.

In one embodiment, to prevent an input ripple from appearing on the first input node 210 or the second input node 220, an inputting capacitor 50 is added in parallel with the AC voltage source 60.

Figure 4:
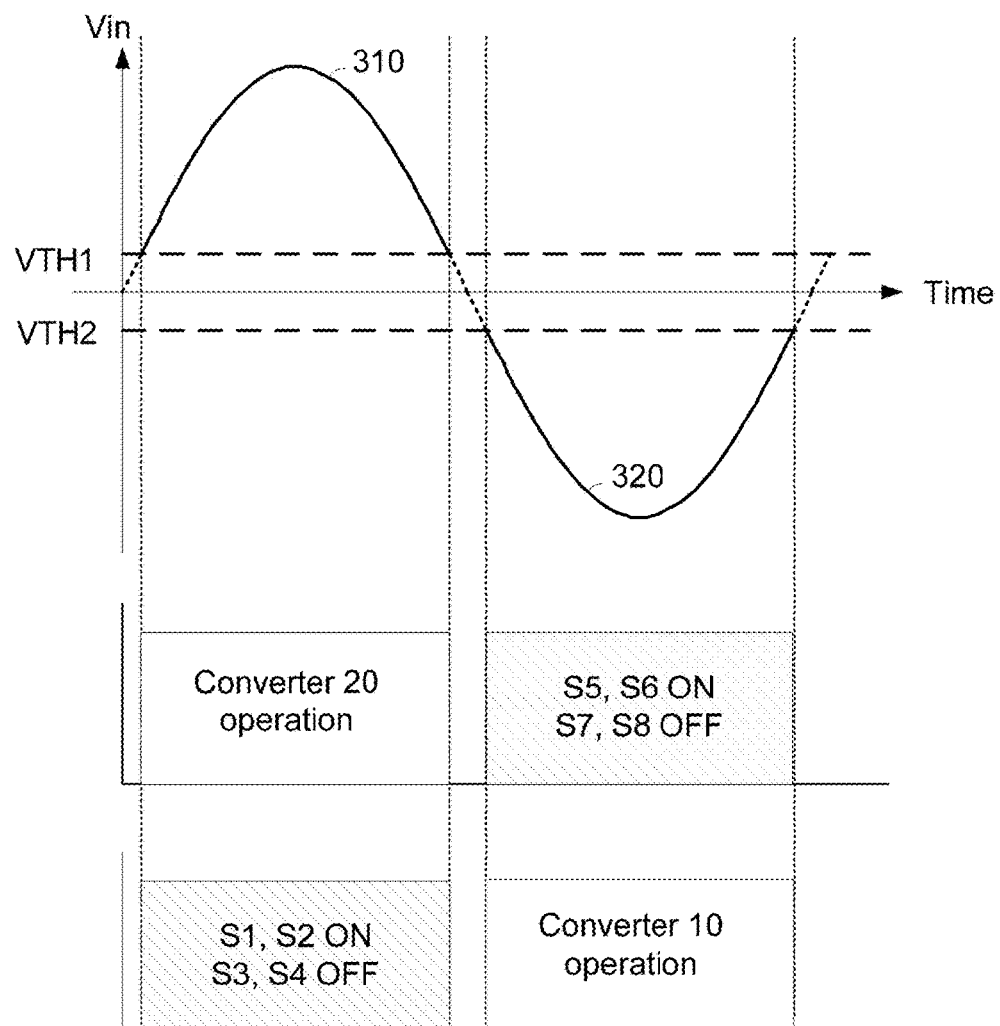
FIG. 4 schematically illustrates an operation diagram of the AC/DC converting apparatus 200 shown in FIG. 3 in accordance with one embodiment of the present invention.

FIG. 4 schematically illustrates an operation diagram of the AC/DC converting apparatus 200 shown in FIG. 3 in accordance with one embodiment of the present invention. As shown in FIG. 4, each cycle of the AC input voltage Vin has a portion 310 having a positive polarity and a portion 320 having a negative polarity, wherein the AC input voltage Vin in the portion 310 is higher than or equal to a first threshold voltage VTH1 that is higher than zero, and the AC input voltage Vin in the portion 320 is less than or equal to a second threshold voltage VTH2 that is less than zero.

When Vin≥TH1, as shown in FIG. 4, the AC input voltage Vin is in the portion 310, the first pair of switches 201 is turned ON so that the input node 210 is coupled to the ground 240, and the second buck-boost converter 20 is configured to convert the AC input voltage in the portion 310 to the DC output voltage Vout, which is accomplished by controlling and modulating ON/OFF states of the third and fourth pair of switches 203 and 204 using the controller 30. The controller 30 selectively modulates the duty cycles of the third and fourth pair of switches 203 and 204 so that the DC output voltage Vout is maintained at a desire and constant level.

When Vin≤TH2, as shown in FIG. 4, the AC input voltage Vin is in the portion 320, the third pair of switches 203 is turned ON so that the input node 220 is coupled to the ground 240, and the first buck-boost converter 10 is configured to convert the AC input voltage in the portion 320 to the DC output voltage Vout, which is accomplished by controlling and modulating ON/OFF states of the first and second pair of switches 201 and 202 using the controller 30. The controller 30 selectively modulates the duty cycles of the first and second pair of switches 201 and 202 so that the DC output voltage Vout is maintained at the desire and constant level.

Figure 1:
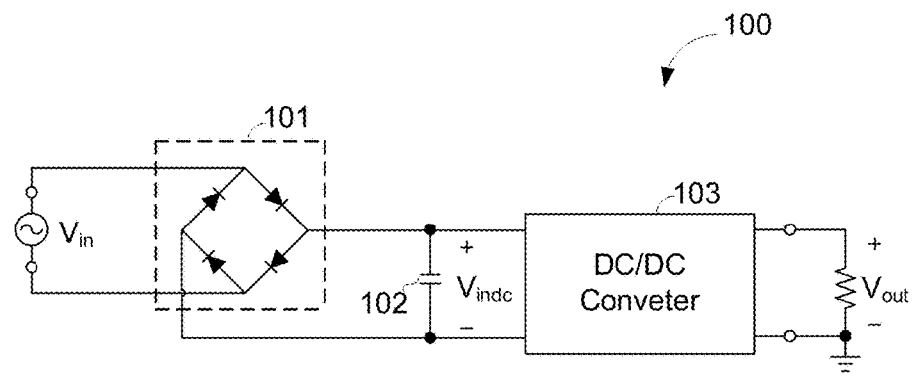
FIG. 1 schematically illustrates a traditional AC/DC converting apparatus 100 for converting an AC input voltage Vin to a DC output voltage Vout.
Figure 2A:
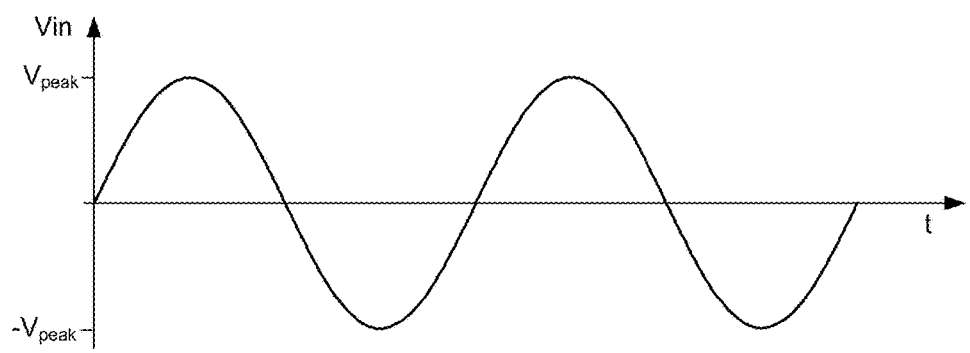
FIG. 2A schematically illustrates a signal waveform of the AC input voltage Vin inputted to the AC/DC converting apparatus 100 in FIG. 1.
Figure 2B:
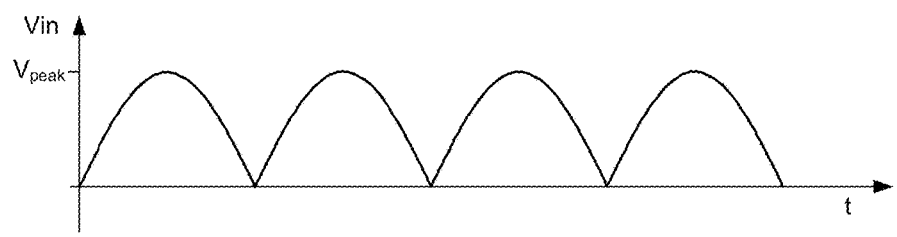
FIG. 2B schematically illustrates a full-wave-rectified voltage waveform produced by a diode rectifier bridge 101 shown in FIG. 1.
Figure 2C:
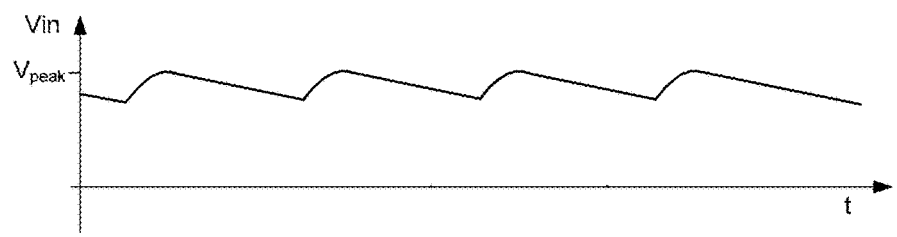
FIG. 2C schematically illustrates a signal waveform of a DC input voltage Vindc after having been smoothed by a high voltage bulk capacitor 102 shown in FIG. 1.

Compared with the AC/DC converting apparatus 100 of FIG. 1, the AC/DC converting apparatus 200 is simpler with single stage direct conversion and has very high conversion efficiency, eliminating the need of the diode rectifier bridge 101 and the need of a high voltage bulk capacitor 102 of FIG. 1. As a result, total system cost is saved and total power solution size is greatly reduced.

In one embodiment, an absolute value of the first threshold voltage VTH1 and an absolute value of the second threshold voltage VTH2 are not equal. In another embodiment, the absolute value of the first threshold voltage VTH1 and the absolute value of the second threshold voltage VTH2 are substantially equal. It is to be understood that "substantially" is a term of art, and is meant to convey the principle that relationship such simultaneity or perfect synchronization cannot be met with exactness, but only within the tolerances of the technology available to a practitioner of the art under discussion.

In one embodiment, the controller 30 further comprises a comparison circuit configured to compare the AC input voltage Vin to the first threshold voltage VTH1 to determine the portion 310 and compare the AC input voltage Vin to a second threshold voltage VTH2 to determine the portion 320. More specifically, when Vin≥TH1, the AC input voltage Vin is in the portion 310, and when Vin≤TH2, the AC input voltage Vin is in the portion 320. In another embodiment, the controller further comprises a judging circuit configured to respond a rate of change of the AC input voltage Vin to determine the portions 310 and 320.

In one embodiment, the first pair of switches 201 serves as a pair of buck switches of the first buck-boost converter 10, the second pair of switches 202 serves as a pair of boost switches of the first buck-boost converter 10. And the third pair of switches 203 serves as a pair of buck switches of the second buck-boost converter 20, the fourth pair of switches 204 serves as a pair of boost switches of the second buck-boost converter 20.

In one embodiment, based on a comparison of the AC input voltage in the portion 320 and an inverting DC output voltage −Vout, the first buck-boost converter 10 is configured to operate in three different operation modes including a first buck mode, a first boost mode, and a first buck-boost mode. More specifically, when the AC input voltage Vin is less than an inverting DC output voltage −Vout, the first buck-boost converter 10 operates in the first buck mode. When the AC input voltage Vin is less than the second threshold voltage VTH2 and higher than the inverting DC output voltage −Vout, the first buck-boost converter 10 operates in the first boost mode. When the AC input voltage Vin is close to the inverting DC output voltage −Vout, the first buck-boost converter 10 operates in the first buck-boost mode.

Based on a comparison of the AC input voltage in the portion 310 and the output voltage Vout, the second buck-boost converter 20 is configured to operate in three different operation modes including a second buck mode, a second boost mode, and a second buck-boost mode. More specifically, when the AC input voltage Vin is less than the DC output voltage Vout and higher than the first threshold voltage VTH1, the second buck-boost converter 20 operates in the second boost mode. When the AC input voltage Vin is close to the DC output voltage Vout, the second buck-boost converter 20 operates in the second buck-boost mode. When the AC input voltage Vin is higher than the DC output voltage Vout, the second buck-boost converter 20 operates in the second buck mode. The details of the embodiments described below with reference to FIG. 5.

Figure 5:
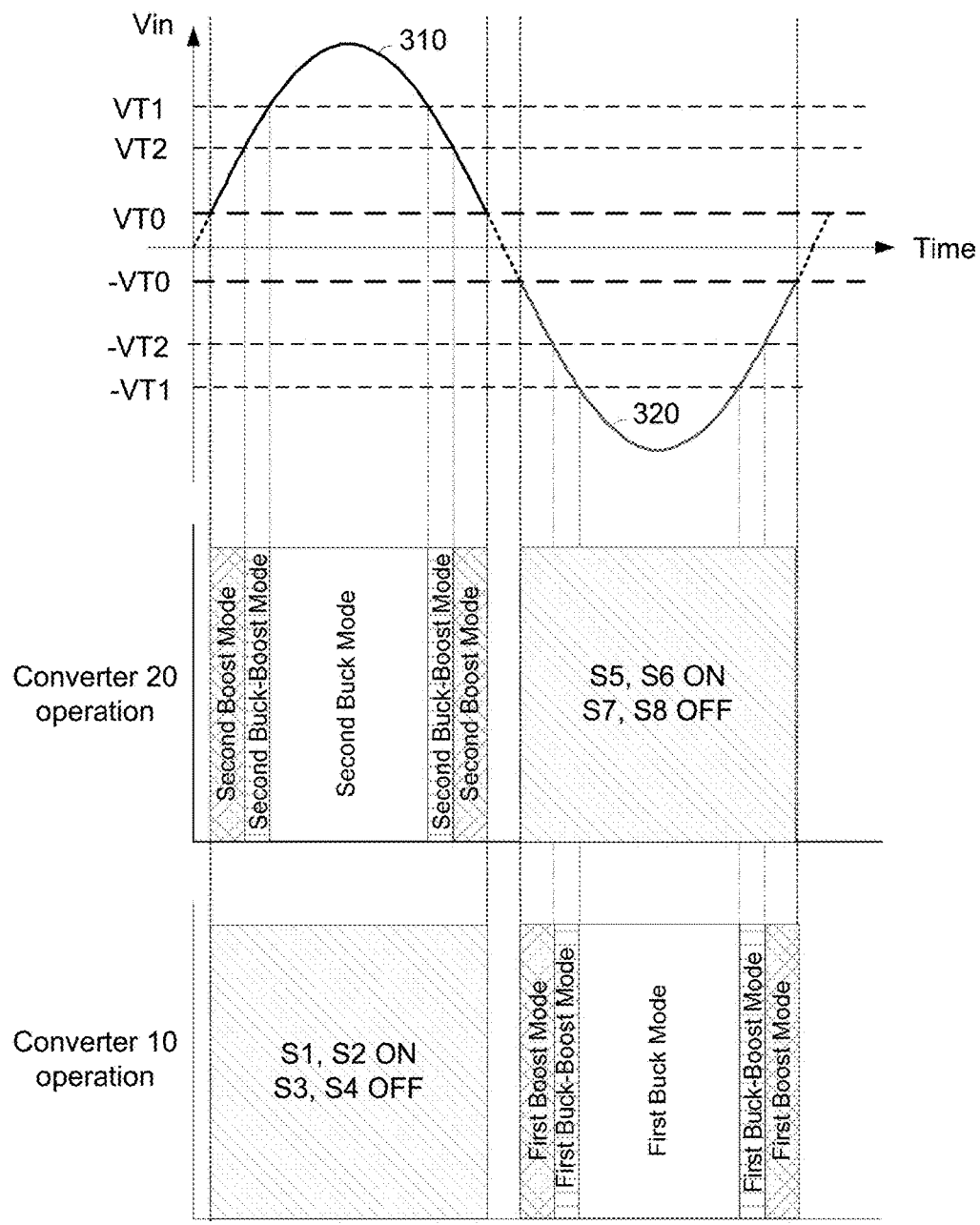
FIG. 5 schematically illustrates another operation diagram of the AC/DC converting apparatus 200 shown in FIG. 3 in accordance with another embodiment of the present invention.

FIG. 5 schematically illustrates another operation diagram of the AC/DC converting apparatus 200 shown in FIG. 3 in accordance with another embodiment of the present invention. In the embodiment of FIG. 5, the first threshold voltage VTH1 is less than the DC output voltage Vout. The second threshold voltage VTH2 is higher than the inverting DC output voltage −Vout.

When the AC input voltage Vin is in the portion 320, the controller 30 keeps the first pair of switches 201 ON and the second pair of switches 202 OFF, the input node 210 is coupled to the ground 240. The AC input voltage Vin in the portion 310 is compared to a first voltage VT1 and a second voltage VT2, respectively. Wherein the first voltage VT1 is proportional to the DC output voltage Vout, i.e. VT1=k1*Vout, and the second voltage VT2 is also proportional to the DC output voltage Vout, i.e. VT2=k2*Vout, and wherein k1 and k2 are constant coefficients, and k1>1, VTH1/VOUT<k2<1. Wherein the second buck-boost converter 20 operates in the second boost mode when VTH1<Vin<VT2, operates in the second buck-boost mode when VT2<Vin<VT1 and operates in the second buck mode when Vin>VT1.

When the AC input voltage Vin is in the portion 320, the controller 30 keeps the third pair of switches 203 ON and the fourth pair of switches 204 OFF, the input node 220 is coupled to the ground 240. The AC input voltage Vin in the portion 320 is compared to a first inverting voltage −VT1 and a second inverting voltage −VT2, respectively. Wherein the first buck-boost converter 10 operates in the first boost mode when −VT2<Vin<VTH2 operates in the first buck-boost mode when −VT1<Vin<−VT2 and operates in the first buck mode when Vin<−VT1.

TABLE 1

How the switches are switched and driven when the AC input voltage Vin is in the portions 310 and 320

| Switch | Vin < VTH2 | | | Vin > VTH1 | | |
| --- | --- | --- | --- | --- | --- | --- |
| | Vin < −VT1 | −VT1 < V in < −VT2 | Vin > −VT2 | Vin > VT1 | VT2 < Vin < VT1 | Vin < VT2 |
| S1 | D1 | D3 | ON | | ON | |
| S2 | 1-D1 | 1-D3 | OFF | | | |
| S3 | OFF | D4 | D2 | | OFF | |
| S4 | ON | 1-D4 | 1-D2 | | | |
| S5 | | ON | | D5 | D7 | ON |
| S6 | | | | 1-D5 | 1-D7 | OFF |
| S7 | | OFF | | OFF | D8 | D6 |
| S8 | | | | ON | 1-D8 | 1-D6 |

Table 1 shows how the switches S1~S8 of the AC/DC converting apparatus 200 in FIG. 3 are switched and driven when the AC input voltage Vin is in the portions 310 and 320. When the AC input voltage Vin is in the portion 320, the first buck-boost converter 10 is configured to operate in three different operation modes with the third pair of switches 203 (S5 and S6) ON and the fourth pair of switches 204 (S7 and S8) OFF. When the AC input voltage Vin is in the portion 310, the second buck-boost converter 20 is configured to operate in three different operation modes with the first pair of switches 201 (S1 and S2) ON and the second pair of switches 202 (S3 and S4) OFF.

When the AC input voltage Vin is less than or equal to the first inverting voltage −VT1, the first buck-boost converter 10 is configured to operate in the first buck mode. More specifically, the bottom switch S3 is turned OFF and the top switch S4 is turned ON, the first pair of switches 201 which acts as a pair of buck switches is turned ON and OFF alternatively, wherein the top switch S1 is controlled by the control signal G1 with a first duty cycle D1, the bottom switch S2 is controlled by the control signal G2 with a duty cycle (1−D1). In this way, the controller 30 modulates the first duty cycle D1, regulating the DC output voltage Vout so that it is maintained at the constant level.

When the AC input voltage Vin is between the second inverting voltage −VT2 and the second threshold voltage VTH2, the first buck-boost converter 10 is configured to operate in the first boost mode. More specifically, the top switch S1 is turned ON and the bottom switch S2 is turned OFF, the second pair of switches 202 which acts as a pair of boost switches is turned ON and OFF alternatively, wherein the bottom switch S3 is controlled by the control signal G3 with a second duty cycle D2, the top switch S4 is controlled by the control signal G4 with a duty cycle (1−D2). In this way, the controller 30 modulates the second duty cycle D2, regulating the DC output voltage Vout so that it is maintained at the constant level.

When the AC input voltage Vin is between the first inverting voltage −VT1 and the second inverting voltage −VT2, the first buck-boost converter 10 is configured to operate in the first buck-boost mode. More specifically, the first pair of switches 201 is turned ON and OFF alternatively, the second pair of switches 202 is turned ON and OFF alternatively, wherein the top switch S1 is controlled by the control signal G1 with a third duty cycle D3, the bottom switch S2 is controlled by the control signal G2 with a duty cycle (1−D3). The bottom switch S3 is controlled by the control signal G3 with a fourth duty cycle D4, the top switch S4 is controlled by the control signal G4 with a duty cycle (1−D4). The controller 30 modulates the third and fourth duty cycles D3 and D4, regulating the DC output voltage Vout so that it is maintained at the constant level.

When the AC input voltage Vin is higher than or equal to the first voltage VT1, the second buck-boost converter 20 is configured to operate in the second buck mode. More specifically, the bottom switch S7 is turned OFF and the top switch S8 is turned ON, the third pair of switches 203 which acts as a pair of buck switches is turned ON and OFF alternatively, wherein the top switch S5 is controlled by the control signal G5 with a fifth duty cycle D5, the bottom switch S6 is controlled by the control signal G6 with a duty cycle (1−D5). In this way, the controller 30 modulates the fifth duty cycle D5, regulating the DC output voltage Vout so that it is maintained at the constant level.

When the AC input voltage Vin is between the second voltage VT2 and the first threshold voltage VTH1, the second buck-boost converter 20 is configured to operate in the second boost mode. More specifically, the top switch S5 is turned ON and the bottom switch S6 is turned OFF, the fourth pair of switches 204 which acts as a pair of boost switches is turned ON and OFF alternatively, wherein the bottom switch S7 is controlled by the control signal G7 with a sixth duty cycle D6, the top switch S8 is controlled by the control signal G8 with a duty cycle (1−D6). In this way, the controller 30 modulates the sixth duty cycle D6, regulating the DC output voltage Vout so that it is maintained at the constant level.

When the AC input voltage Vin is between the first voltage VT1 and the second voltage VT2, the controller 30 identifies the second buck-boost mode and configures the second buck-boost converter 20 to operate in the second buck-boost mode. More specifically, the third pair of switches 203 is turned ON and OFF alternatively, the fourth pair of switches 204 is turned ON and OFF alternatively, wherein the top switch S5 is controlled by the control signal G5 with a seventh duty cycle D7, the bottom switch S6 is controlled by the control signal G6 with a duty cycle (1−D7), the bottom switch S7 is controlled by the control signal G7 with an eighth duty cycle D8, the top switch S8 is controlled by the control signal G8 with a duty cycle (1−D8). The controller 30 modulates the seventh and eighth duty cycles D7 and D8, regulating the DC output voltage Vout so that it is maintained at the constant level.

Figure 6:
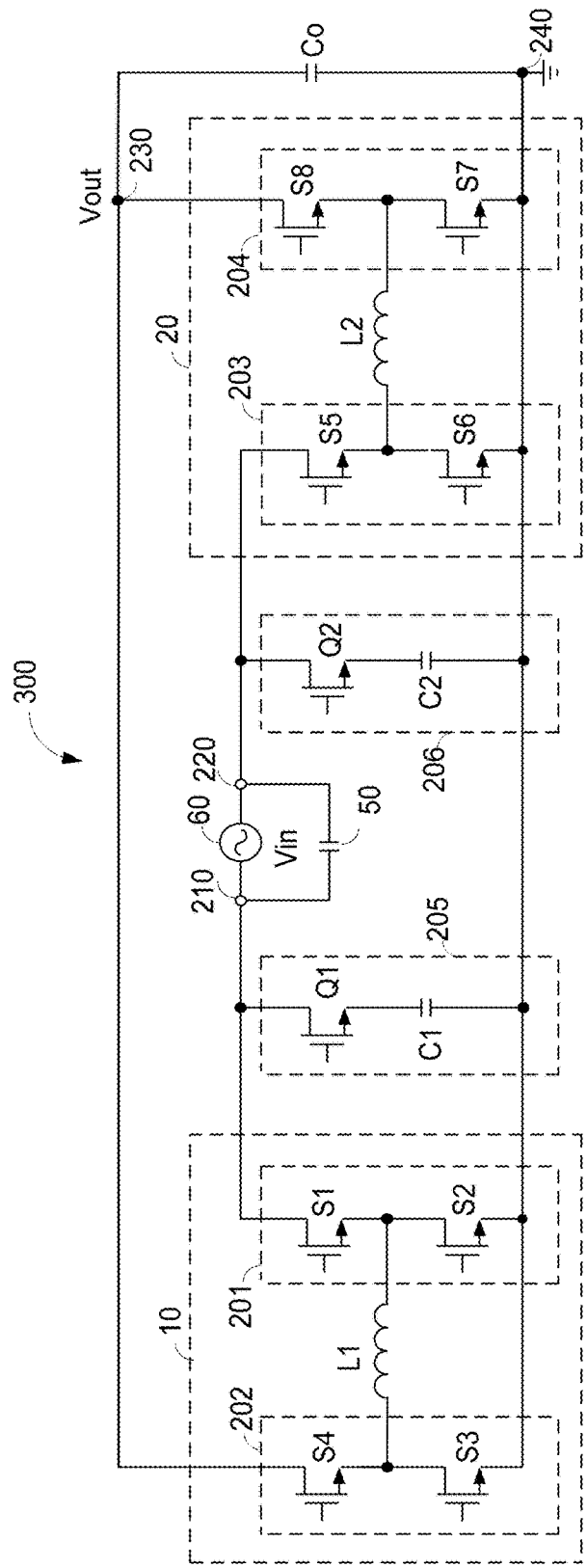
FIG. 6 schematically illustrates an AC/DC converting apparatus 300 for converting an AC input voltage Vin to a DC output voltage Vout in accordance with one embodiment of the present invention.

FIG. 6 schematically illustrates an AC/DC converting apparatus 300 for converting an AC input voltage Vin to a DC output voltage Vout in accordance with one embodiment of the present invention. The AC/DC converting apparatus 200 shown in FIG. 3 and the AC/DC converting apparatus 300 shown in FIG. 6 are different and a difference is that the AC/DC converting apparatus 300 further comprises a first energy storage circuit 205 and a second energy storage circuit 206.

In the embodiment of FIG. 6, the first energy storage circuit 205 comprises a control switch Q1 and a capacitor C1 which are coupled in series between the input node 210 and the ground 240, the second energy storage circuit 206 comprises a control switch Q2 and a capacitor C2 which are coupled in series between the input node 220 and the ground 240.

Figure 7A:
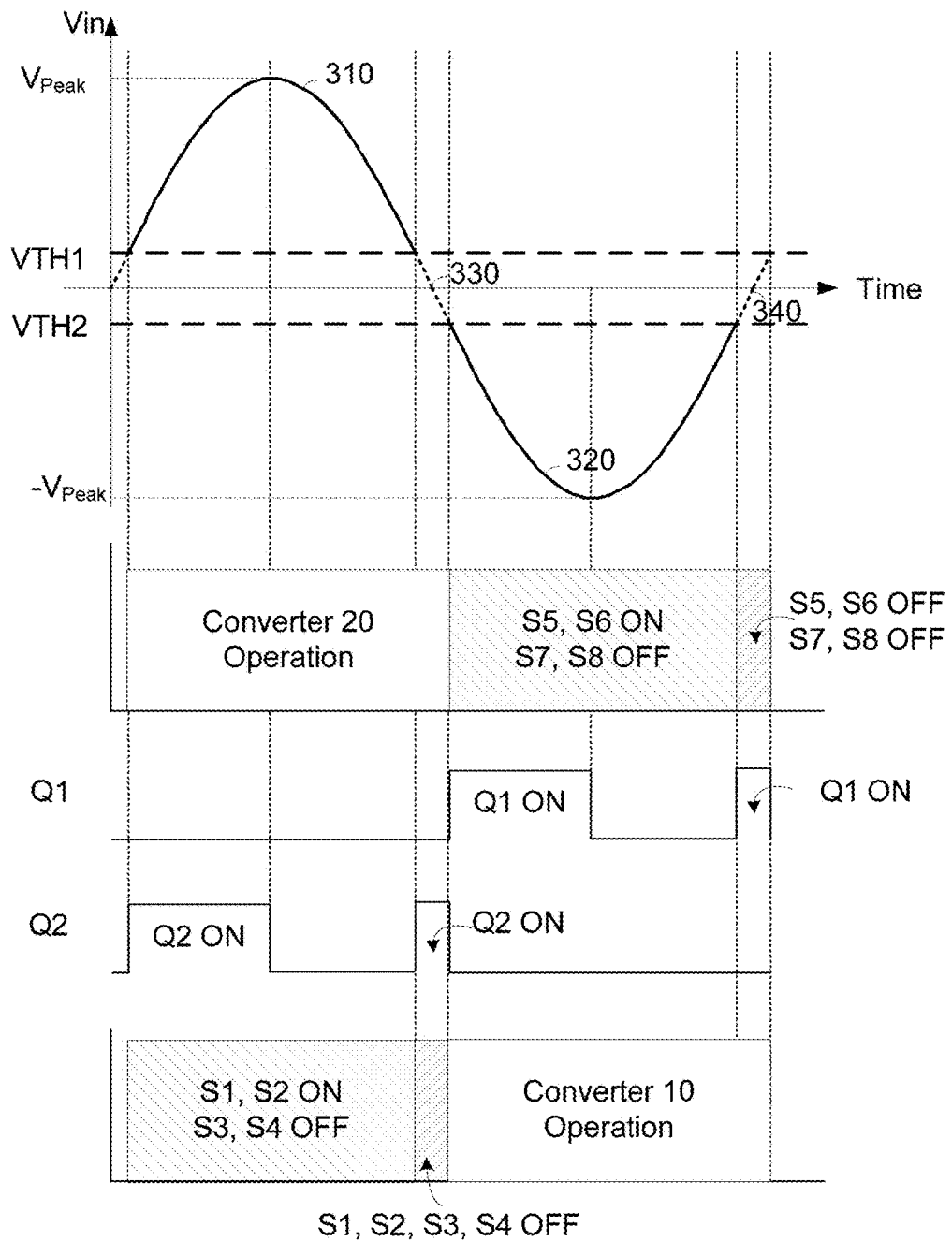
FIG. 7A schematically illustrates an operation diagram of the AC/DC converting apparatus 300 shown in FIG. 3 in accordance with one embodiment of the present invention.

FIG. 7A schematically illustrates an operation diagram of the AC/DC converting apparatus 300 shown in FIG. 6 in accordance with one embodiment of the present invention.

As shown in FIG. 7A, each cycle of the AC input voltage Vin has four independent portions including a portion 310 having the positive polarity, a portion 320 having the negative polarity, a portion 330 changing the polarity from positive to negative, and a portion 340 changing the polarity from negative to positive. Wherein the AC input voltage in the portion 310 is higher than a first threshold voltage VTH1 that is higher than zero, the AC input voltage in the portion 320 is less than a second threshold voltage VTH2 that is less than zero, the first threshold voltage VTH1 is not less than the amplitude of the AC input voltage in the portion 330, the absolute value of the second threshold voltage VTH2 is not less than the amplitude of the AC input voltage in the portion 340.

When the AC input voltage Vin is in the portion 310, as shown in FIG. 7A when Vin≥TH1, the first pair of switches 201 is turned ON so that the input node 210 is coupled to the ground 240, the control switch Q2 of the second energy storage circuit 206 is turned ON so that the capacitor C2 is coupled to the input node 220 and is allowed to receive current from the AC input voltage Vin, and the second buck-boost converter 20 is configured to maintain the DC output voltage Vout at the constant level.

When the AC input voltage Vin is in the portion 330, as shown in FIG. 7A when Vin decreases from the first voltage threshold VTH1 to the second voltage threshold voltage VTH2, the first pair of switches 201 is turned OFF, the control switch Q2 of the second energy storage circuit 206 is turned ON so that the capacitor C2 is coupled to the input node 220 and is allowed to supply current to an input of the second buck-boost converter 20 to maintain the DC output voltage Vout at the constant level.

When the AC input voltage Vin is in the portion 320, as shown in FIG. 7A when Vin≤TH2, the third pair of switches 203 is turned ON so that the input node 220 is coupled to the ground 240, the control switch Q1 of the first energy storage circuit 205 is turned ON so that the capacitor C1 is coupled to the input node 210 and is allowed to receive current from the AC input voltage Vin, and the first buck-boost converter 10 is configured to maintain the DC output voltage Vout at the constant level.

When the AC input voltage Vin is in the portion 340, as shown in FIG. 7A when Vin increases from the second voltage threshold VTH2 to the first voltage threshold voltage VTH1, the third pair of switches 203 is turned OFF, the control switch Q1 of the first energy storage circuit 205 is turned ON so that the capacitor C1 is coupled to the input node 210 and is allowed to supply current to an input of the first buck-boost converter 10 to maintain the DC output voltage Vout at the constant level.

Therefore, the first buck-boost converter 10 is configured to maintain the DC output voltage Vout at the constant level when the AC input voltage Vin is in the portions 320 and 340, the second buck-boost converter 20 is configured to maintain the DC output voltage Vout at the constant level when the AC input voltage Vin is in the portions 310 and 330.

In one embodiment, the second buck-boost converter 20 is configured to operate in three different operational modes based on a comparison between a voltage at the input node 220 and the DC output voltage Vout when the AC input voltage is in the portions 310 and 330. Several of the details of the embodiments described below with reference to FIGS. 7A, 8-10. The first buck-boost converter 10 is configured to operate in three different operational modes based on a comparison between a voltage at the input node 210 and the DC output voltage Vout when the AC input voltage is in the portions 320 and 340, The first buck-boost converter 10 operates generally similarly as that of the second buck-boost converter 20. As a result, operation of first buck-boost converter 10 is omitted for clarity.

Figure 8:
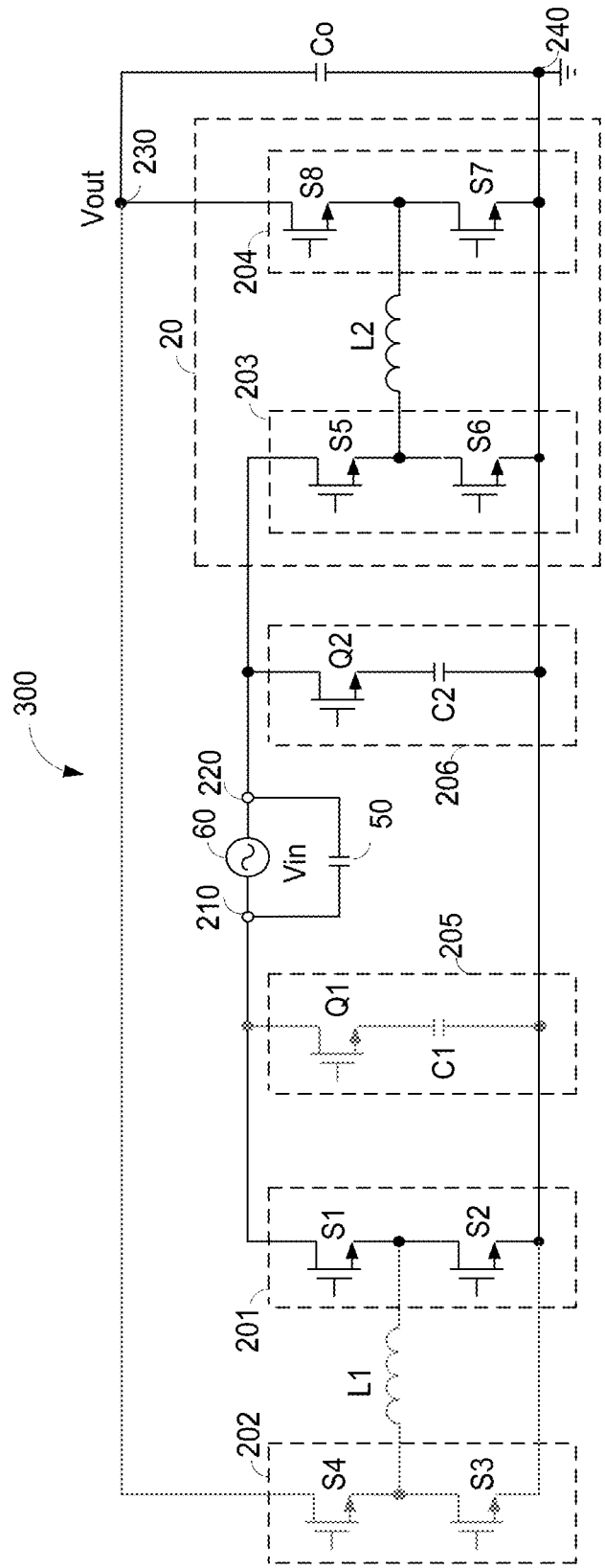
FIG. 8 schematically illustrates an operation of the AC/DC converting apparatus 300 when the AC input voltage Vin is in the portions 310 in accordance with one embodiment of the present invention.

As shown in FIG. 8, when Vin is in the portion 310 and increases from the first threshold voltage VTH1 to a peak voltage Vpeak, the first pair of switches 201 is turned ON so that the input node 210 is coupled to the ground 240, the second pair of switches 202 is turned OFF, the control switch Q2 of the second energy storage circuit 206 is turned ON so that the capacitor C2 is coupled to the input node 220 to receive current from the AC input voltage Vin, the second buck-boost converter 20 is configured to operate and maintain the DC output voltage Vout at the constant level.

Figure 9:
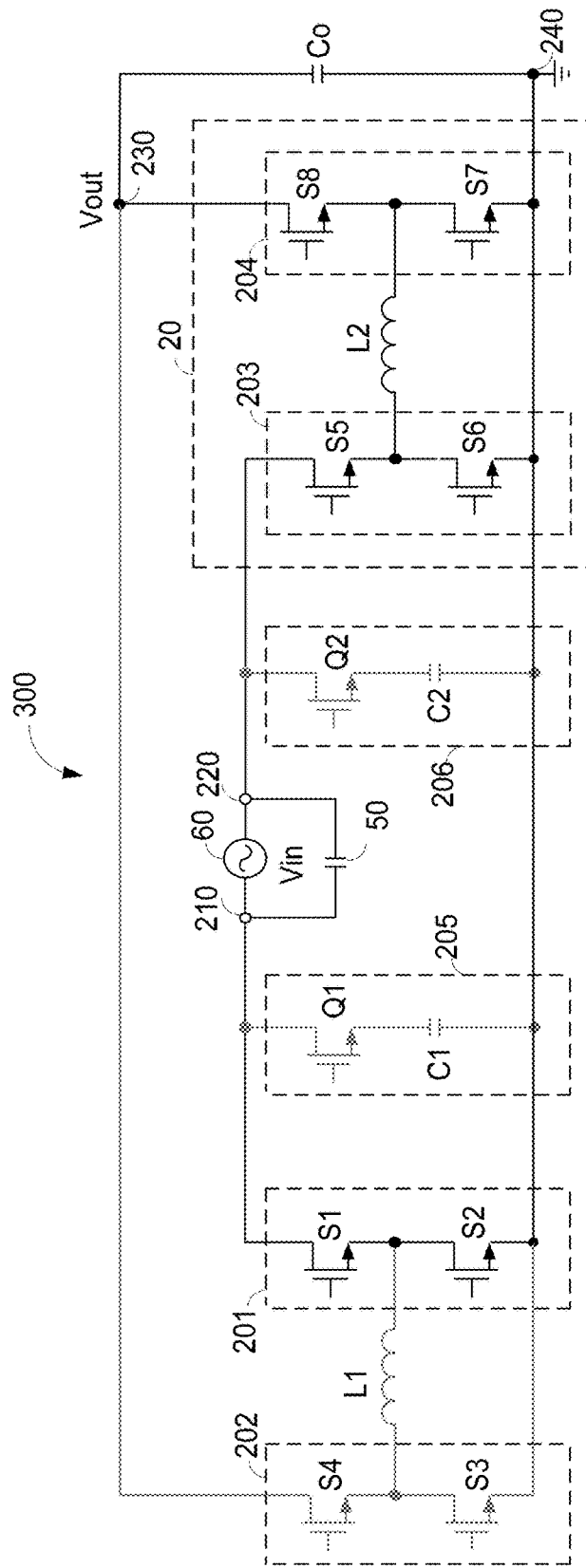
FIG. 9 schematically illustrates another operation of the AC/DC converting apparatus 300 when the AC input voltage Vin is in the portions 310 in accordance with one embodiment of the present invention.

As shown in FIG. 9, when Vin is in the portion 310 and decreases from the peak voltage Vpeak to the first threshold voltage VTH, the first pair of switches 201 is kept ON, the second pair of switches 202 is kept OFF, the control switch Q2 is turned OFF so that the capacitor C2 is decoupled from the input node 220 to prevent receiving current from the AC input voltage Vin, the second buck-boost converter 20 is still configured to operate and maintain the DC output voltage Vout at the constant level.

Figure 10:
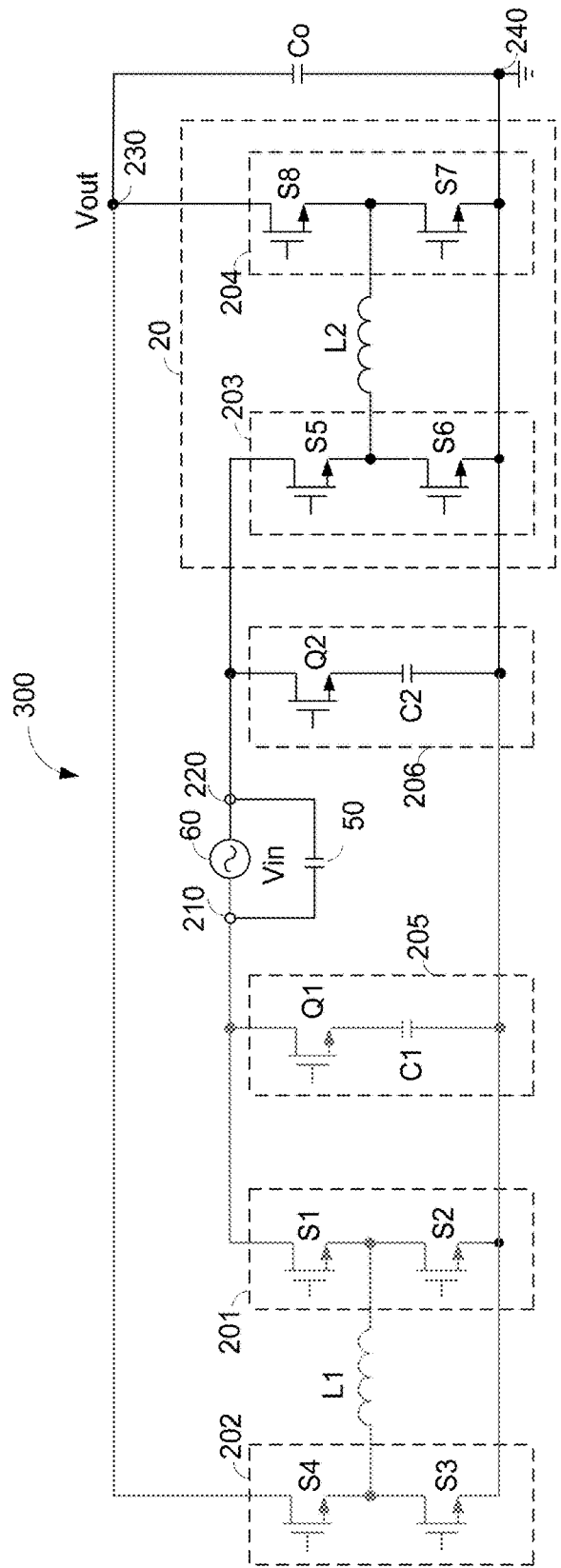
FIG. 10 schematically illustrates an operation of the AC/DC converting apparatus 300 when the AC input voltage Vin is in the portions 330 in accordance with one embodiment of the present invention.

As shown in FIG. 10, when Vin is in the portion 320 and decreases from the first threshold voltage VTH to the second threshold voltage VTH2, the first pair of switches 201 is turned OFF, the second pair of switches 202 is kept OFF, the control switch Q2 is turned ON so that the capacitor C2 is coupled from the input node 220 to supply current to the second buck-boost converter 20, the second buck-boost converter 20 is configured to operate and maintain the DC output voltage Vout at the constant level.

Figure 7B:
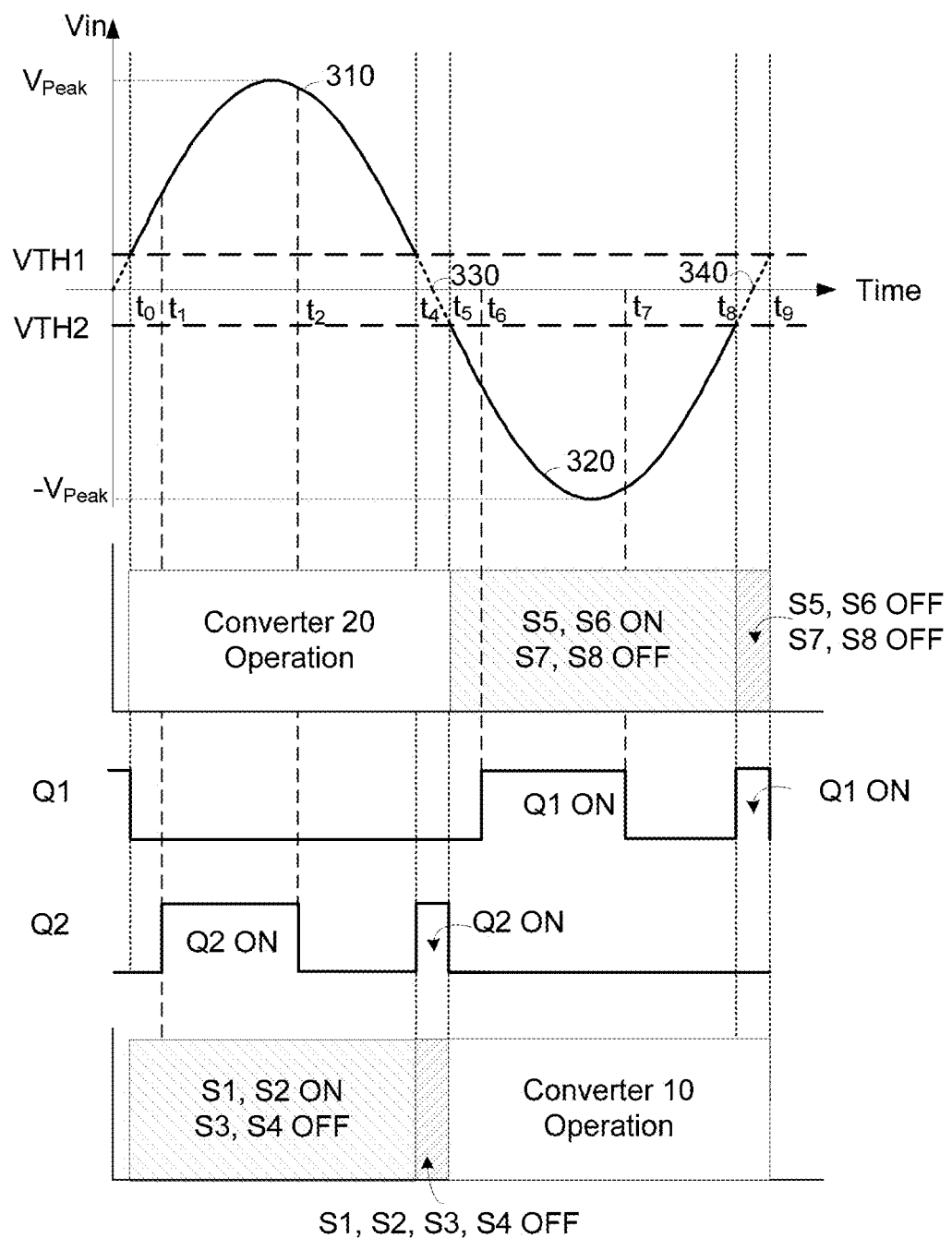
FIG. 7B schematically illustrates another operation diagram of the AC/DC converting apparatus 300 shown in FIG. 3 in accordance with one embodiment of the present invention.

FIG. 7B schematically illustrates another operation diagram of the AC/DC converting apparatus 300 shown in FIG. 6 in accordance with one embodiment of the present invention. Referring now to FIG. 7B, each cycle of the AC input voltage Vin has four independent portions including a portion 310 having the positive polarity, a portion 320 having the negative polarity, a portion 330 changing the polarity from positive to negative, and a portion 340 changing the polarity from negative to positive.

As shown in FIG. 7B, from time t0 to t4, the AC input voltage Vin is in the portion 310. At this period from t0 to t4, the first pair of switches 201 is turned ON so that the input node 210 is coupled to the ground 240, the second buck-boost converter 20 is configured to convert the AC input voltage Vin to the DC output Vout.

At time t1, Vin is increased to higher than VC2, the control switch Q2 of the second energy storage circuit 206 is turned ON so that the capacitor C2 is coupled to the input node 220 and is allowed to receive current from the AC input voltage Vin, wherein VC2 is the voltage across the capacitor C2. From time t2 to t4, the control switch Q2 is turned OFF, the capacitor C2 is decoupled from the input node 220 and is prevented from receiving current from the AC input voltage Vin.

From time t4 to t5, the AC input voltage Vin is in the portion 330, as shown in FIG. 7B, when Vin decreases from the first voltage threshold VTH1 to the second voltage threshold voltage VTH2, the first pair of switches 201 is turned OFF, the control switch Q2 of the second energy storage circuit 206 is turned ON so that the capacitor C2 is coupled to the input node 220 and is allowed to supply current to an input of the second buck-boost converter 20 to maintain the DC output voltage Vout at the constant level.

From time t5 to t8, Vin≤TH2, the AC input voltage Vin is in the portion 320, the third pair of switches 203 is turned ON so that the input node 220 is coupled to the ground 240, the first buck-boost converter 10 is configured to convert the AC input voltage Vin to the DC output Vout.

At time t6, an absolute of the AC input voltage Vin is increased to higher than VC1, the control switch Q1 of the first energy storage circuit 205 is turned ON so that the capacitor C1 is coupled to the input node 210 and is allowed to receive current from the AC input voltage Vin, wherein VC1 is the voltage across the capacitor C1. From time t7 to t8, the control switch Q1 is turned OFF, the capacitor C1 is decoupled from the input node 210 and is prevented from receiving current from the AC input voltage Vin.

From t8 to t9, Vin increases from the second voltage threshold VTH2 to the first voltage threshold voltage VTH1, the AC input voltage Vin is in the portion 340, the third pair of switches 203 is turned OFF, the control switch Q1 of the first energy storage circuit 205 is turned ON so that the capacitor C1 is coupled to the input node 210 and is allowed to supply current to an input of the first buck-boost converter 10 to maintain the DC output voltage Vout at the constant level.

Figure 11:
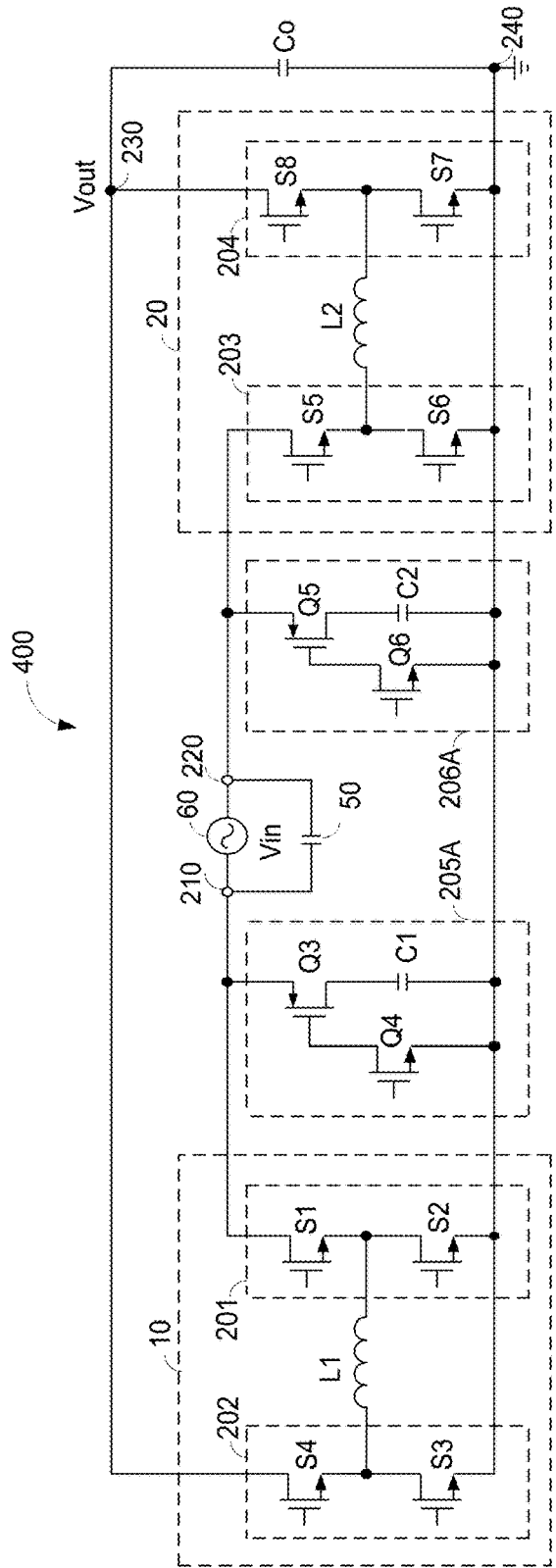
FIG. 11 schematically illustrates an AC/DC converting apparatus 400 for converting an AC input voltage Vin to a DC output voltage Vout in accordance with one embodiment of the present invention.

FIG. 11 schematically illustrates an AC/DC converting apparatus 400 for converting an AC input voltage Vin to a DC output voltage Vout in accordance with one embodiment of the present invention. The AC/DC converting apparatus 300 shown in FIG. 6 and the AC/DC converting apparatus 300 shown in FIG. 11 are different and a difference is the structure of the energy storage circuit.

The first energy storage circuit 205A shown in FIG. 11 comprises a first control switch Q3, a first driving switch Q4 and a capacitor C1. The first energy storage circuit 206A shown in FIG. 11 comprises a second control switch Q5, a first driving switch Q6 and a capacitor C2. The first control switch Q3 has a first terminal, a second terminal and a control terminal, wherein the first terminal is coupled to the input node 210. The capacitor C1 has a first terminal coupled to the second terminal of the first control switch Q3 and a second terminal coupled to the ground 240. The first driving switch Q4 has a first terminal, a second terminal and a control terminal, wherein the first terminal is coupled to the control terminal of the first control switch Q3, the second terminal is coupled to the ground 240. The second control switch Q5 has a first terminal, a second terminal and a control terminal, wherein the first terminal is coupled to the input node 220. The capacitor C2 has a first terminal coupled to the second terminal of the first control switch Q5 and a second terminal coupled to the ground 240. The second driving switch Q6 has a first terminal, a second terminal and a control terminal, wherein the first terminal is coupled to the control terminal of the second control switch Q5, the second terminal is coupled to the ground 240.

In one embodiment, the first control switch Q3 comprises a PMOS, the first driving switch Q4 comprises a NMOS, the second control switch Q5 comprises a PMOS, the second driving switch Q6 comprises a NMOS.

Figure 12:
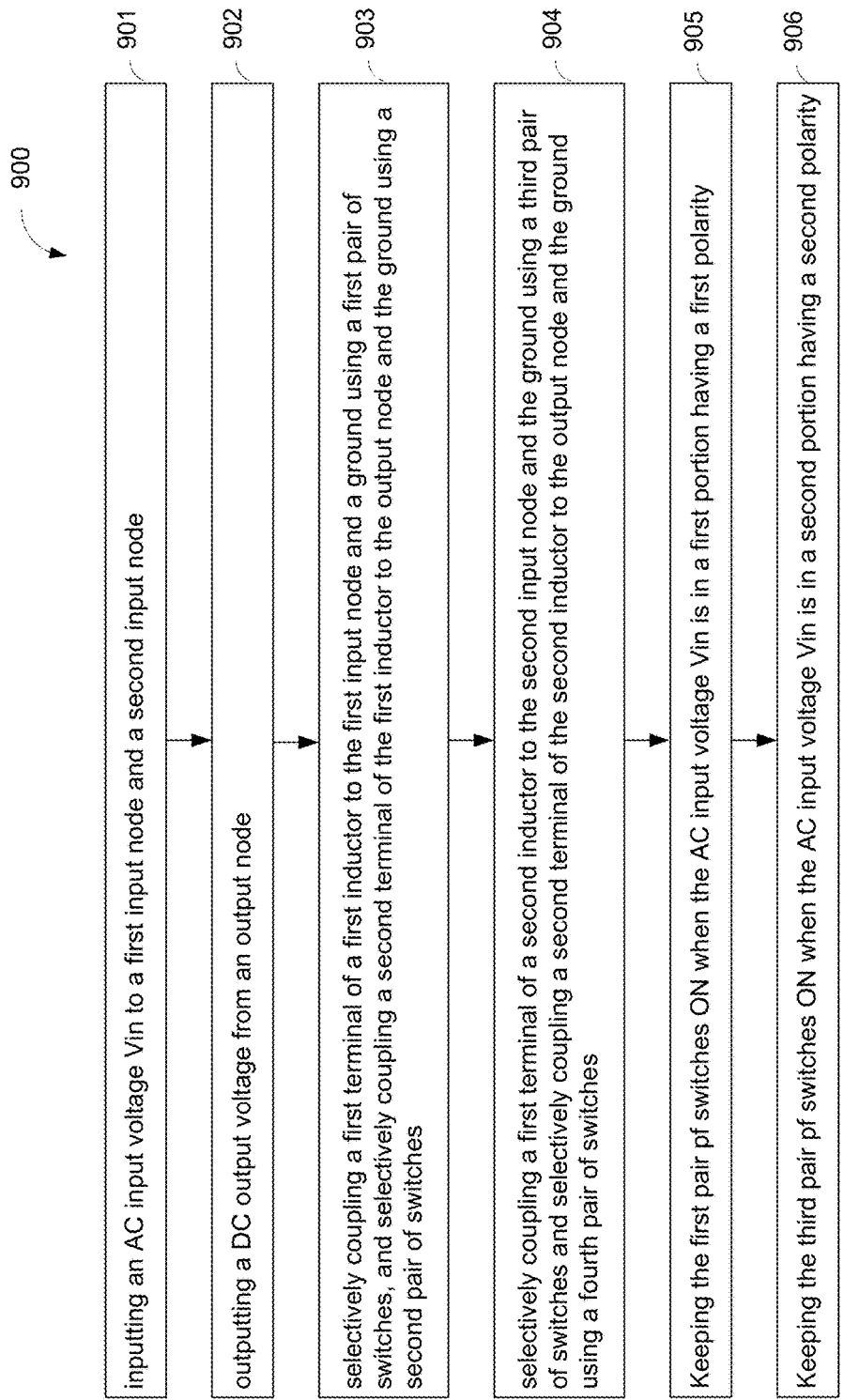
FIG. 12 schematically illustrates a flow chart of a method 900 for converting an AC input voltage Vin to a DC output voltage Vout in accordance with an embodiment of the present invention.

FIG. 12 schematically illustrates a flow chart of a method 900 for converting an AC input voltage Vin to a DC output voltage Vout in accordance with an embodiment of the present invention. The method comprises steps S901-S906.

At step S901, the AC input voltage Vin is inputted to a first input node and a second input node.

At step S902, the DC output voltage Vout is outputted from an output node.

At step S903, a first terminal of a first inductor is selectively coupled to the first input node and a ground using a first pair of switches, a second terminal of the first inductor is selectively coupled to the output node and the ground using a second pair of switches. In one embodiment, the first pair of switches serves as a pair of buck switches of a first buck-boost converter, the second pair of switches serves as a pair of boost switches of the first buck-boost converter.

At step S904, a first terminal of a second inductor is selectively coupled to the second input node and the ground using a third pair of switches, a second terminal of the second inductor is selectively coupled to the output node and the ground using a fourth pair of switches. In one embodiment, the third pair of switches serves as a pair of buck switches of a second buck-boost converter, the fourth pair of switches serves as a pair of boost switches of the second buck-boost converter.

At step S905, when the AC input voltage Vin is in the first portion having a first polarity, the first pair of switches is turned ON to apply the AC input voltage Vin to an input of the second buck-boost converter.

At step S906, when the AC input voltage Vin is in the second portion having a second polarity, the third pair of switches is turned ON to apply the AC input voltage Vin to an input of the first buck-boost converter.

In one embodiment, the first portion is determined by comparing the AC input voltage Vin to a first threshold voltage having the first polarity, the second portion is determined by comparing the AC input voltage Vin to a second threshold voltage having the second polarity. In a further embodiment, an absolute value of the first threshold voltage and an absolute value of the second threshold voltage are substantially equal. In another embodiment, the absolute of the first threshold voltage is less than the DC output voltage Vout.

In one embodiment, each cycle of the AC input voltage Vin comprises four independent portions comprises the first portion, the second portion, a third portion changing the polarity from the first polarity to the second polarity and a fourth portion changing the polarity from the second polarity to the first polarity. In one embodiment, the absolute value of the first threshold voltage is not less than the amplitude of the AC input voltage in the third portion, and the absolute value of the second threshold voltage is not less than the amplitude of the AC input voltage in the fourth portion.

In one embodiment, the first buck-boost converter is configured to maintain the DC output voltage at a constant level when the AC input voltage Vin is in the third portion and the fourth portion, the second buck-boost converter is configured to maintain the DC output voltage at the constant level when the AC input voltage Vin is in the first portion and the second portion.

The method 900 further comprises: engaging a first energy storage circuit to allow a first capacitor of the energy storage circuit to receive current from the AC input voltage Vin when the AC input voltage Vin is in the second portion; engaging the first energy storage circuit to allow the first capacitor to supply current to the first buck-boost converter when the AC input voltage Vin is in a third portion; engaging a second energy storage circuit to allow a second capacitor of the second storage circuit to receive current the AC input voltage Vin when the AC input voltage Vin is in the first portion and engaging a second energy storage circuit to allow the second capacitor to provide current to supply current to the second buck-boost converter when the AC input voltage Vin is in a fourth portion.

In one embodiment, the first buck-boost converter is configured to operate in three different operation modes based on a comparison between the voltage at the first input node and the DC output voltage Vout, the second buck-boost converter is configured to operate in three different operation modes based on a comparison between the voltage at the second input node and the DC output voltage Vout.

Note that in the flow chart described above, the box functions may also be implemented with different order as shown in FIG. 9. For example, two successive box functions may be executed meanwhile, or sometimes the box functions may be executed in a reverse order.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. An AC/DC converting apparatus for converting an AC input voltage Vin to a DC output voltage Vout, comprising:
a first input node and a second input node to which the AC input voltage Vin is inputted, wherein a cycle of the AC input voltage has a first portion having a first polarity and a second portion having a second polarity;
an output node from which the DC output voltage Vout is outputted;
a first buck-boost converter having a first pair of switches for selectively coupling a first terminal of a first inductor to the first input node and a ground, and a second pair of switches for selectively coupling a second terminal of the first inductor to the output node and the ground;
a second buck-boost converter having a third pair of switches for selectively coupling a first terminal of a second inductor to the second input node and the ground, and a fourth pair of switches for selectively coupling a second terminal of the second inductor to the output node and the ground; and a controller configured to control the first, second, third and fourth pair of switches, wherein the first pair of switches is turned ON when the AC input voltage Vin is in the first portion, and the third pair of switches is turned ON when the AC input voltage Vin is in the second portion.

2. The AC/DC converting apparatus of claim 1, wherein the controller comprises a comparison circuit configured to compare the AC input voltage Vin to a first threshold voltage having the first polarity to determine the first portion and compare the AC input voltage Vin to a second threshold voltage having a second polarity to determine the second portion.

3. The AC/DC converting apparatus of claim 2, wherein an absolute value of the first threshold voltage and an absolute value of the second threshold voltage are substantially equal.

4. The AC/DC converting apparatus of claim 2, wherein an absolute of the first threshold voltage is less than the DC output voltage Vout.

5. The AC/DC converting apparatus of claim 2, wherein the cycle of the AC input voltage Vin further comprises a third portion changing the polarity from the first polarity to the second polarity and a fourth portion changing the polarity from the second polarity to the first polarity, and wherein:
the first buck-boost converter is configured to maintain the DC output voltage at a constant level when the AC input voltage Vin is in the third portion and the fourth portion; and
the second buck-boost converter is configured to maintain the DC output voltage at the constant level when the AC input voltage Vin is in the first portion and the second portion.

6. The AC/DC converting apparatus of claim 5, further comprises:
a first energy storage circuit coupled between the first input node and the ground, and wherein the first energy storage circuit is configured to receive current from the AC input voltage Vin when the AC input voltage Vin is in the second portion, and to supply current to the first buck-boost converter when the AC input voltage Vin is in the fourth portion; and
a second energy storage circuit coupled between the second input node and the ground, and wherein the second energy storage circuit is configured to receive current from the AC input voltage Vin when the AC input voltage Vin is in the first portion, and to supply current to the second buck-boost converter when the AC input voltage Vin is in the third portion.

7. The AC/DC converting apparatus of claim 6, wherein:
the first energy storage circuit comprises:
a first control switch having a first terminal, a second terminal and a control terminal, wherein the first terminal is coupled to the first input node;
a first capacitor having a first terminal coupled to the second terminal of the first control switch and a second terminal coupled to the ground;
a first driving switch having a first terminal, a second terminal and a control terminal, wherein the first terminal is coupled to the control terminal of the first control switch, the second terminal is coupled to the ground, and a control terminal;
the second energy storage circuit comprises:
a second control switch having a first terminal, a second terminal and a control terminal, wherein the first terminal is coupled to the second input node;
a second capacitor having a first terminal coupled to the second terminal of the second control switch and a second terminal coupled to the ground; and
a second driving switch having a first terminal, a second terminal and a control terminal, wherein the first terminal is coupled to the control terminal of the second control switch, the second terminal is coupled to the ground.

8. The AC/DC converting apparatus of claim 5, wherein an absolute value of the first threshold voltage is not less than the amplitude of the AC input voltage in the third portion, and an absolute value of the second threshold voltage is not less than the amplitude of the AC input voltage in the fourth portion.

9. The AC/DC converting apparatus of claim 1, wherein the first portion and the second portion are determined by responding a rate of change of the AC input voltage Vin.

10. The AC/DC converting apparatus of claim 1, wherein
the first buck-boost converter is configured to operate in three different operation modes including a first buck mode, a first boost mode and a first buck-boost mode;
the second buck-boost converter is configured to operate in three different operation modes including a second buck mode, a second boost mode and a second buck-boost mode.

11. A method of converting an AC input voltage Vin to a DC output voltage Vout, the method comprising:
inputting the AC input voltage Vin to a first input node and a second input node, wherein a cycle of the AC input voltage has a first portion having a first polarity and a second portion having a second polarity;
outputting the DC output voltage Vout from an output node;
selectively coupling a first terminal of a first inductor to the first input node and a ground using a first pair of switches and selectively coupling a second terminal of the first inductor to the output node and the ground using a second pair of switches;
selectively coupling a first terminal of a second inductor to the second input node and the ground using a third pair of switches and selectively coupling a second terminal of the second inductor to the output node and the ground using a fourth pair of switches;
keeping the first pair of switches ON when the AC input voltage Vin is in the first portion; and
keeping the third pair of switches ON when the AC input voltage Vin is in the second portion.

12. The method of claim 11, wherein:
the first portion is determined by comparing the AC input voltage Vin to a first threshold voltage having the first polarity; and
the second portion is determined by comparing the AC input voltage Vin to a second threshold voltage having the second polarity.

13. The method of claim 12, wherein an absolute value of the first threshold voltage and an absolute value of the second threshold voltage are substantially equal.

14. The method of claim 12, wherein an absolute of the first threshold voltage is less than the DC output voltage Vout.

15. The method of claim 12, wherein
the first pair of switches serves as a pair of buck switches of a first buck-boost converter, the second pair of switches serves as a pair of boost switches of the first buck-boost converter; and
the third pair of switches serves as a pair of buck switches of a second buck-boost converter, the fourth pair of switches serves as a pair of boost switches of the second buck-boost converter.

16. The method of claim 15, wherein the cycle of the AC input voltage Vin further comprises a third portion changing the polarity from the first polarity to the second polarity and a fourth portion changing the polarity from the second polarity to the first polarity, and wherein:
the first buck-boost converter is configured to maintain the DC output voltage at a constant level when the AC input voltage Vin is in the third portion and the fourth portion; and
the second buck-boost converter is configured to maintain the DC output voltage at the constant level when the AC input voltage Vin is in the first portion and the second portion.

17. The method of claim 16, further comprises:
engaging a first energy storage circuit to allow a first capacitor of the energy storage circuit to receive current from the AC input voltage Vin when the AC input voltage Vin is in the second portion;
engaging the first energy storage circuit to allow the first capacitor to supply current to the first buck-boost converter when the AC input voltage Vin is in a third portion;
engaging a second energy storage circuit to allow a second capacitor of the second storage circuit to receive current the AC input voltage Vin when the AC input voltage Vin is in the first portion; and
engaging a second energy storage circuit to allow the second capacitor to provide current to supply current to the second buck-boost converter when the AC input voltage Vin is in a fourth portion.

18. The method of claim 17, wherein an absolute value of the first threshold voltage is not less than the amplitude of the AC input voltage in the third portion, and an absolute value of the second threshold voltage is not less than the amplitude of the AC input voltage in the fourth portion.

19. The method of claim 17, wherein the first pair of switches is turned OFF when the AC input voltage is in the third portion, and the third pair of switches is turned OFF when the AC input voltage is in the fourth portion.

20. The method of claim 15, further comprise:
the first buck-boost converter is configured to operate in three different operation modes including a first buck mode, a first boost mode and a first buck-boost mode;
the second buck-boost converter is configured to operate in three different operation modes including a second buck mode, a second boost mode and a second buck-boost mode.

* * * * *